UNITED STATES PATENT OFFICE.

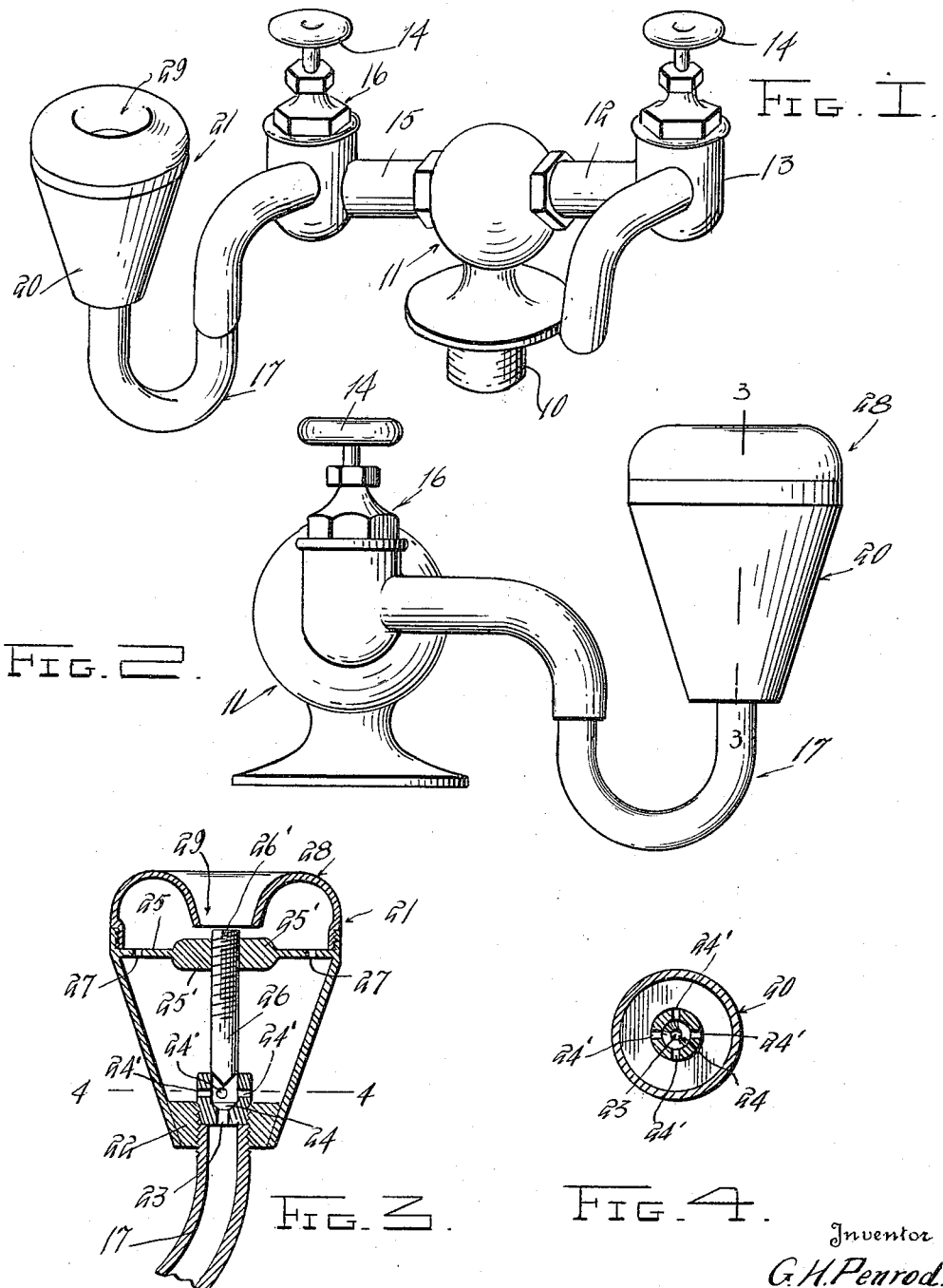

GEORGE H. PENROD, OF EVELETH, MINNESOTA.

COMBINED FAUCET AND FOUNTAIN.

1,150,963.  Specification of Letters Patent.  Patented Aug. 24, 1915.

Application filed June 22, 1914. Serial No. 846,630.

*To all whom it may concern:*

Be it known that I, GEORGE H. PENROD, a citizen of the United States, residing at Eveleth, in the county of St. Louis, State of Minnesota, have invented certain new and useful Improvements in Combined Faucets and Fountains; and I do hereby declare the following to be a full, clear, and exact description of the invention, such as will enable others skilled in the art to which it appertains to make and use the same.

This invention relates to water supply and has special reference to a combined faucet and drinking fountain apparatus.

The present invention is in the nature of an improvement over the device forming the subject matter of my prior Patent No. 1,122,416, dated December 29, 1914.

The principal object of the invention is to provide an improved fountain of this description which may be attached to any suitable goose neck pipe.

The second object of the invention is to provide a sanitary and improved drinking fountain which may be connected to a water pipe in combination with an ordinary faucet or may be used by itself.

Another object of the invention is to provide an improved means for rendering the flow of water from such a fountain slow and regular so as to prevent splashing.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—Figure 1 is a perspective view of a fountain constructed in accordance with this invention. Fig. 2 is a side elevation thereof. Fig. 3 is a section on the line 3—3 of Fig 2. Fig. 4 is a section on the line 4—4 of Fig. 3.

In carrying out the objects of this invention there is provided the usual outlet or supply pipe 10 and to this pipe is connected a branch or T fitting 11 to which are connected the pipes 12. One of these pipes 12 has connected thereto a faucet 13 of the usual type and provided, as is usual, with a suitable valve 14. The other of these pipes has connected thereto a pipe 15 having a valve 16 therein of the same type as the valve 14. This pipe 15 has its forward end turned downward and connected to this forward end is a substantially J-shaped pipe 17. On the end of this pipe 17 is screwed a fitting 20 which is of inverted frusto-conical shape and which has connected to the periphery of the fitting a cup 21. There is furthermore connected to this fitting and extending centrally of the cup a plug 22 which is provided with a passage 23 having a valve seat 24. This plug is also provided with lateral bleed openings or passages 24'. At 25 is a partition provided with centrally disposed bosses 25' having a threaded opening therethrough wherein is screwed the needle valve 26. Adjacent the periphery of this partition are openings 27 similar to the openings 24'. By means of this needle valve the flow of water through the opening 24 may be regulated, the valve being provided with a slot 26' on its upper end for the reception of a screw driver.

The cup 21 is of inverted frusto-conical shape but the upper edge of this cup is extended straight upwardly to form a cylindrical piece or top whereon is mounted a mouth piece 28. This mouth piece 28 extends upwardly from the rim of the cup and is then curved inwardly and downwardly so as to provide an opening 29 immediately over the boss 24. Now when the water is turned on the water flows up through the pipe 22 and escapes through the opening 26 so that the cup 21 is filled. The water then rises through the openings 27 and passes slowly up through the mouth 29 over the curved outer surface of the mouth piece thus enabling a person to drink from the mouth piece without difficulty and by reason of the constant flow of water this mouth piece is kept clean and free from all contamination.

It will be observed that the flow of water may be regulated independent of the pressure by proper adjustment of the needle valve 26.

There has thus been provided a simple and efficient device of the kind described and of the character specified.

It will be obvious that many minor changes may be made in the form and construction of this invention without departing from the material principles thereof. It is not therefore desired to confine the invention to the exact form and construction herein shown and described, but it is wished to include all such as come properly within the scope claimed.

Having thus described the invention, what is claimed as new, is:

A drinking fountain comprising a body adapted to be screwed onto the end of a pipe, a plug threaded to seat in the bottom wall of the body portion centrally thereof, said plug being bored vertically to provide a valve seat, said plug having a vertical bore forming communication between the pipe and the bore and lateral bores forming communication between the bore of the plug and the interior of the body portion, a partition extending horizontally across the upper end of the body and having spaced openings extending therethrough, a mouth piece connected with the body portion above the partition and having a central outlet, a vertically disposed needle valve threadedly engaging through the central portion of the partition and having its lower end adapted to extend into the bore of the plug and to seat on the valve seat therein to close the ports in the plug, said valve being adapted for movement to and from the valve seat.

In testimony whereof, I affix my signature, in the presence of two witnesses.

GEORGE H. PENROD.

Witnesses:
JNO. B. NORRIS,
A. W. ATWATER.

Copies of this patent may be obtained for five cents each, by addressing the "Commissioner of Patents, Washington, D. C."